United States Patent [19]

Vecchiotti

[11] 4,124,427

[45] Nov. 7, 1978

[54] METHOD AND APPARATUS FOR SEALING A MICROPOROUS PLASTIC MATERIAL

[75] Inventor: Camillo M. Vecchiotti, Ridgewood, N.J.

[73] Assignee: Amerace Corporation, New York, N.Y.

[21] Appl. No.: 817,454

[22] Filed: Jul. 20, 1977

Related U.S. Application Data

[63] Continuation of Ser. No. 612,481, Sep. 11, 1975, abandoned.

[51] Int. Cl.² .................. B29C 27/04; B29D 23/10
[52] U.S. Cl. ............................. 156/217; 156/273; 156/380; 156/443; 156/502; 219/10.53; 219/10.81
[58] Field of Search .............. 156/273, 272, 214, 217, 156/218, 227, 380, 443, 492, 502, 580, 583; 219/10.53, 10.81; 100/93 P

[56] References Cited

U.S. PATENT DOCUMENTS

| 2,438,498 | 3/1948 | Geist, Sr. et al. ................. 156/380 |
| 2,441,699 | 5/1948 | Gramelspacher .............. 156/380 X |
| 2,635,127 | 4/1953 | Yardney et al. ................ 29/139 |
| 3,088,118 | 5/1963 | Clark ................................. 156/273 |
| 3,360,420 | 12/1967 | Paul et al. ......................... 156/492 |
| 3,580,780 | 5/1971 | Klawunn et al. ............ 219/10.53 X |
| 3,681,170 | 8/1972 | Pevitt, Jr. ......................... 156/380 |
| 3,696,061 | 10/1972 | Selsor et al. ............. 260/2.5 R X |
| 3,892,620 | 7/1975 | Heussy ............................ 156/443 |
| 3,996,088 | 12/1976 | Crouch ............................ 156/273 |

Primary Examiner—Michael G. Wityshyn
Attorney, Agent, or Firm—S. Michael Bender; Ken Richardson

[57] ABSTRACT

An apparatus for heat-sealing two lapped end portions of a sheet of microporous plastic material in a substantially envelope or sleeve-like form in which a platen is adapted to receive the sheet material and the opposed walls of the sheet material are forced or urged towards the platen to align the end portions. A predetermined amount of dielectric heat energy is applied to the end portions to seal them together.

13 Claims, 6 Drawing Figures

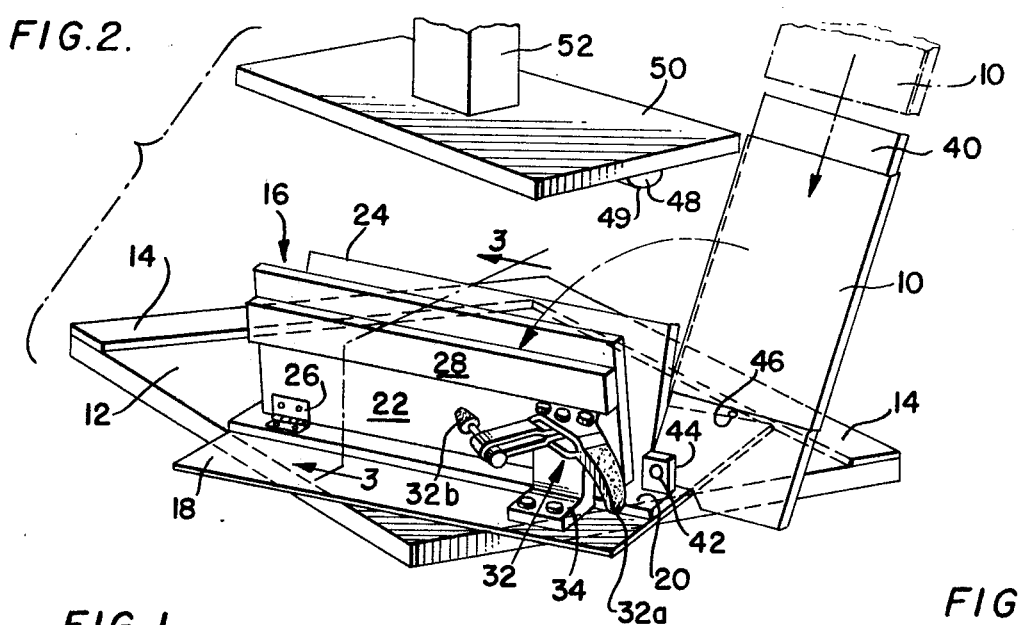
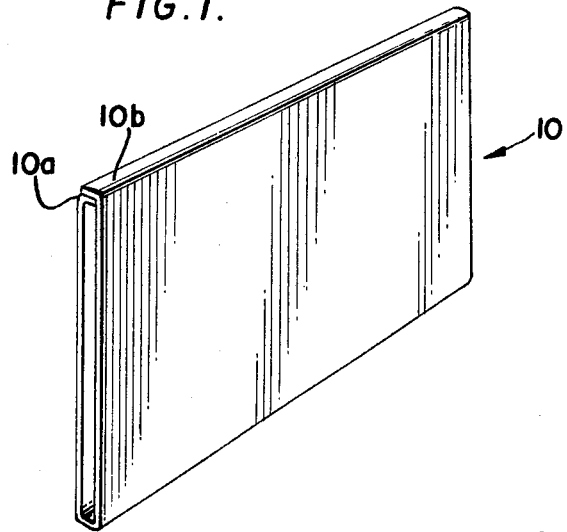
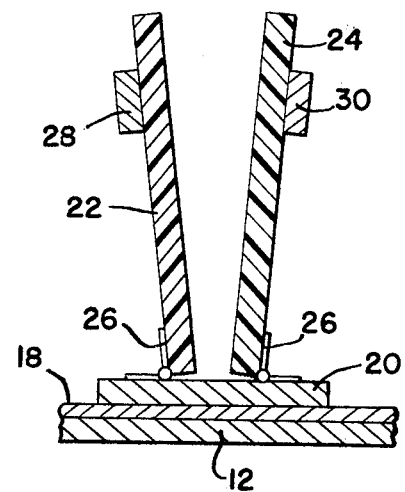
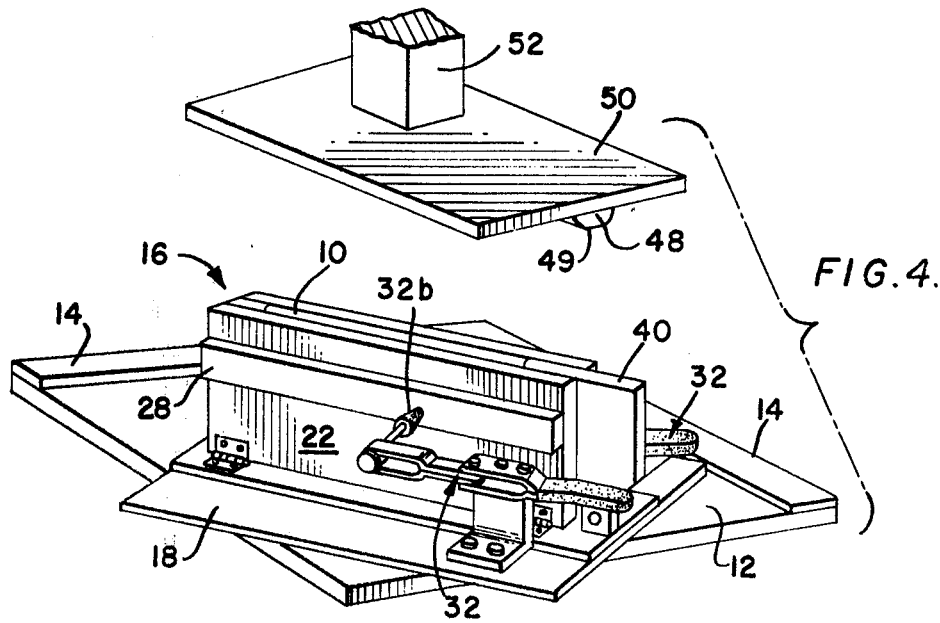

METHOD AND APPARATUS FOR SEALING A MICROPOROUS PLASTIC MATERIAL

This is a continuation of application Ser. No. 612,481, filed Sept. 11, 1975 now abandoned.

BACKGROUND OF THE INVENTION

This invention relates to a method and apparatus for sealing a microporous plastic material and, more particularly, to such an apparatus in which two lapped end portions of the sheet material are dielectrically heat sealed together.

Traditionally, wet cell batteries employ at least one pair of opposite polarity planar electrodes, normally referred to as plates, which are closely spaced in a parallel relationship and immersed in a liquid electrolyte to form an electrochemical couple. A great majority of these type batteries employ a plurality of electrically opposed polarity plates with the plates being normally arranged in an upstanding face-to-face relation, and with the exact number of plates in a particular battery depending upon the capacity and/or voltage desired.

To avoid adjacent opposite polarity plates from coming into direct physical contact and thereby causing arcing and/or short circuiting, it is necessary to electrically insulate the adjacent plates from each other. To achieve this insulation, electrically insulative material, usually in the form of sheets similar in size to the electrode plates, and commonly referred to as separators, have been positioned between the opposite polarity plates, with the insulative material being permeable or semi-permeable to the liquid electrolyte to sustain the ionic conduction required for the battery action.

In older designs, the separators were formed of rubber, wood, or glass while more recent designs have used microporous plastic materials, including, for example, polyethylene, vinyl resin, and the like, which have excellent insulating capabilities yet are relatively low in weight and cost. An example of such a plastic separator is disclosed in U.S. Pat. No. 3,696,061, issued on Oct. 3, 1972, in the name of Selsor et al. and assigned to the same assignee as the present application.

In industrial batteries where heavy duty use requires maximum insulation between the positive and negative plates be provided, it has been found advantageous to envelope either the positive or negative plates with an insulating material, formed and folded to dimensions dictated by the plate size. In a typical envelope configuration, one side of the envelope is formed continuously and the other side is formed by the end portions of the sheet which are overlapped and sealed, so that the envelope has completely insulating sides to prevent lead dendrites from forming from the negative to the positive plates when the battery is charging and discharging in service.

Although battery separators of a plastic material of the general type disclosed above and as specifically disclosed in the aforementioned Selsor et al. patent have proven to be quite satisfactory, the inherent brittleness of this material requires special care during handling. As a result, it has been found difficult to fold the material into the desired envelope configuration and to heat seal the above-mentioned end portions on a high production, relatively inexpensive basis.

In U.S. patent application Ser. No. 535,980 filed on Dec. 23, 1974, now Pat. No. 4,002,417 by the same inventor as the present invention and assigned to the same assignee as the present invention, an apparatus is disclosed which folds a relatively brittle plastic sheet material into an envelope or sleeve-like configuration with one side of the envelope being formed by the overlapping end portions of the sheet. In order to complete the manufacturing process, it thus becomes desirable to seal these overlapping end portions in order to form the completed envelope.

SUMMARY OF THE INVENTION

It is therefore an object of the present invention to provide a method and apparatus for heat sealing microporous plastic materials.

It is a more particular object of the present invention to provide a method and apparatus for dielectrically heat sealing two lapped end portions of a microporous plastic sheet material in a substantially envelope or sleeve-like form.

Toward the fulfillment of these and other objects, the apparatus of the present invention comprises a platen for receiving the sheet material in envelope form, means for forcing or urging the opposed walls of the sheet material towards the platen to align the two overlapped end portions of the sheet, and means for applying a predetermined amount of dielectric heat energy to the end portions seal them together.

BRIEF DESCRIPTION OF THE DRAWINGS

FIG. 1 is an enlarged perspective view of a microporous plastic sheet material formed into an envelope and having two lapped end portions which are sealed utilizing the apparatus of the present invention;

FIG. 2 is a perspective view of the apparatus of the present invention in an inoperative state;

FIG. 3 is an enlarged cross-sectional view taken along the line of 3—3 of FIG. 2;

FIG. 4 is a view similar to FIG. 2 but depicting the material of FIG. 1 inserted in the apparatus;

DESCRIPTION OF THE PREFERRED EMBODIMENT

Figure 5:
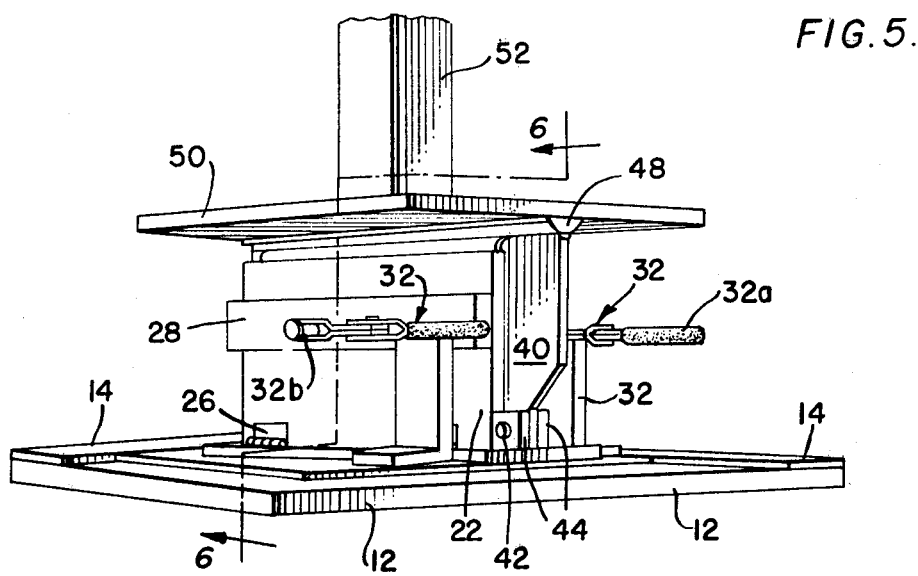
FIG. 5 is a view similar to FIG. 4 but showing an advanced stage of operation of the apparatus of the present invention.

Referring specifically to FIG. 1 of the drawings, the reference numeral 10 refers in general to an envelope or sleeve formed from a plastic sheet material such as the type disclosed in the above-mentioned U.S. Pat. No. 3,696,061 which is hereby incorporated herein by reference. The envelope 10 may be formed in any known manner, such as by the apparatus disclosed in the above-identified application Ser. No. 535,980, and includes two inwardly-directed, overlapped end or tab portions 10a and 10b which together form one side wall of the envelope. It will be appreciated that while the apparatus of the present invention may be used in heat sealing virtually any plastic sheet material, the present apparatus is particularly effective when used to seal microporous plastic sheet material such as, for example, the material fabricated using the method described in U.S. Pat. No. 3,696,061. This material comprises a polymeric resinous matrix (preferably polyvinyl chloride) having particles of an inorganic filler (preferably silica) dispersed throughout said matrix with a network of micropores being formed throughout. In the past a great deal of difficulty has been experienced in heat sealing silica filled microporous plastic sheet material employing conventional heat sealing devices due, in part, to the presence of the silica filler material.

The apparatus of the present invention is shown in FIGS. 2 and 3 and is designed to dielectrically heat seal the two end portions 10a and 10b together. In particular, a bedplate 12 is provided which forms the upper surface of a table or which rests on a tabletop. A pair of guide rails 14 are disposed on the bedplate.

A clamping assembly, shown in general by the reference numeral 16, is disposed on the bedplate 12 and includes a base plate 18 in a rectangular sheet configuration which is adapted for sliding movement upon the bedplate 12 within limits defined by the guide rails 14. A support plate 20 is mounted on the upper face of the base plate 18 and is attached thereto in any conventional manner.

A pair of clamping plates 22 and 24 are pivotally mounted to the support plate 20 by hinges 26 and are shown in their open or inoperative position in FIG. 2. Both the height of plates 22 and 24 as well as the spacing between the plates 22 and 24 may be adjusted employing conventional adjusting devices not shown. A pair of reinforcing bars 28 and 30 are mounted on the outer surfaces of the plates 22 and 24, respectively. A toggle clamp 32 is mounted on a support bracket 34 which, in turn, is affixed to the upper surface of the plate 18. The toggle clamp 32 includes a handle portion 32a and a clamping portion 32b which engages the reinforcing bar 28 upon movement of the handle portion 32a inwardly, to exert a mechanical force against the reinforcing bar and therefore the plate 22. Although not shown in FIG. 2, it is understood that a toggle clamp 32 and a support bracket 34 are also disposed on the other side of the plate 24 and engage the reinforcing bar 30 of the plate 24 in an identical manner. It will be appreciated that the toggle clamp 32 may be replaced by an air cylinder (not shown) to provide the necessary mechanical force against plate 22.

A plate electrode 40, which also functions as a platen, is rotatably mounted about a shaft 42 which is supported relative to the plate 20 by a pair of brackets, one of which is shown in FIG. 2 by the reference numeral 44. The electrode 40 is shown in an inoperative, upright position in FIG. 2 and is configured to correspond to the inner shape of the envelope 10. The envelope 10 is placed over the electrode 40 by simply sliding the envelope over the electrode in the direction indicated by the arrow until the leading end of the envelope engages a pin 46 extending from one side portion of the electrode.

Figure 6:
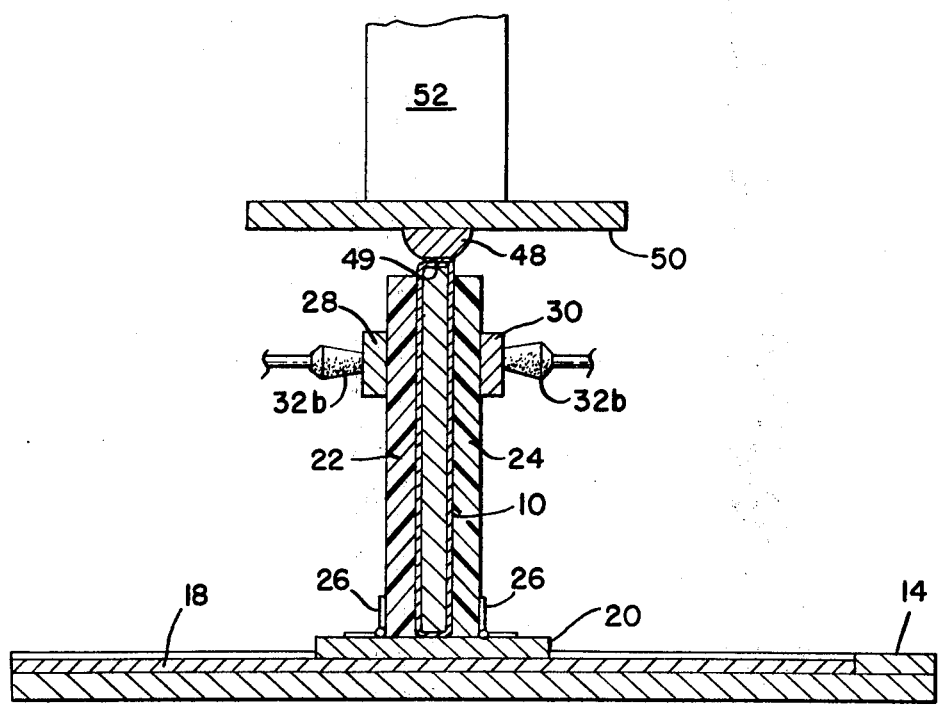
FIG. 6 is an enlarged cross-sectional view taken along the line 6—6 of FIG. 5.

A bar electrode 48 is supported on a movable support plate 50 and extends over the clamping assembly 16 in the inoperative position of FIG. 2. As best seen in FIG. 6, the bar electrode 48 has a substantially semi-circular transverse cross-sectional configuration with a flat contact surface 49 and arcuately shaped side portions extending from the contact surface 49 to the support plate 50 for reasons to be described in detail later. The transverse extent of flat contact surface 49 should be less than the transverse extent of end portions 10a and 10b so that the flat contact surface 49 will contact the end portion 10b of envelope 10, but will not come into contact with the envelope along the fold lines defining either end portion 10a or 10b. An air cylinder shown schematically by the reference numeral 52 is adapted to move the plate 50 and therefore the bar electrode 48 in a generally up and down direction relative to the clamping assembly 16. Since this type of air cylinder is well known in the art, it will not be described in any further detail It is understood that the bedplate 12, the plates 18 and 20, and the electrodes 40 and 48 are all of an electrically conductive material to conduct electrical energy in a manner to be described in detail later. As an example, the bedplate 12, the plates 18 and 20, and the bar 44 can be of an aluminum material while the electrode 40 may be of a brass material. Also, the clamping plates 22 and 24 may be of a dielectric material such as, for example, plastic.

In operation, the apparatus is placed in the inoperative position shown in FIG. 2, i.e., with the plate electrode 40 in its upright position and with the clamping assembly 16 in its canted position out of contact with the guide rails 14 so that the upright plate electrode 40 clears the upper support plate 50. The envelope 10 is placed over the plate electrode 40 and indexed relative thereto by the pin 46, with the overlapped end portions 10a and 10b of the envelope resting along the trailing edge of the electrode. The toggle clamps 32 are maintained in their inoperative position shown in FIG. 2 with the clamping plates 22 and 24 thus resting in their spread apart, or inoperative, position as shown in FIG. 2.

The plate electrode 40, with the envelope extending therearound, is then pivoted inwardly about the shaft 42 between the two clamping plates 22 and 24 in the direction indicated by the arrow until its leading edge rests on the upper surface of the support plate 20, as shown in FIG. 4. The handle portions 32a of the toggle clamps 32 are forced inwardly to cause or urge the plates 22 and 24 to pivot about their hinges 26 toward the electrode 40 and thus clamp the envelope 10 between the electrode and the plates to insure an optimum alignment of the envelope and, in particular, the end portions 10a and 10b.

The clamping assembly 16 is then moved to the position of FIG. 5 by sliding the plate 18 on the bedplate 12 until the leading edges of the plate 18 abut the guide rails 14. The air cylinder 52 is then actuated to move the support plate 50 and therefore the flat contact surface 49 of the bar electrode 48 into engagement with the upper lapped end portion 10b of the envelope for forcing upper end portion 10b against the other end portion 10a and the upper edge of plate electrode or platen 40 under a predetermined pressure sufficient to effect intimate contact between the engaged end portions 10a and 10b along their transverse extents so that, upon the application of electrical energy and particularly high frequency electrical energy such as, for example, radio frequency current in the range of about 27 MgHz through said end portions 10a and 10b, a uniform seal may be effected.

A predetermined amount of electrical power from an external source (not shown) is then applied to the bar electrode 48, with the electrical current flowing from the latter electrode through the plate electrode 40, the aluminum plates 18 and 20, and the bedplate 12 where the circuit is completed through auxiliary components, not shown. This electrical energy is applied for a predetermined time to enable a proportional amount of heat energy to be generated while the pressure is maintained by the air cylinder 52. The particular cross-sectional shape and dimension of the electrode 48 with its flat contact surface 49 and arcuate sides extending from the surface 49 serves to permit an optimum transfer of the heat energy to the interface between the overlapped end portions 10a and 10b while minimizing thermal stresses along the fold lines defining the end portions 10a and 10b, thus reducing the likelihood of the end portions cracking along these fold lines during the sealing operation. Thus, the applied heat is concentrated generally in the longitudinally extending central region of the overlapped end portions 10a and 10b rather than being applied across the entire transverse extent of the overlapped portions 10a and 10b. Further, the possibility of the end portions 10a and 10b cracking due to contact with a sharp edge is minimized due to the fact that the sides which extend from the flat surface 49 are arcuate. In this manner, the end portions 10a and 10b are fused, or heat sealed, by the resulting dielectric heat.

The air cylinder 52 is then actuated to move the bar electrode 48 to its upper, inoperative position and the clamping assembly 16 is moved to its inoperative position, as shown in FIG. 4, to permit the electrode 40 to be swung to its upright position as shown in FIG. 2 and the sealed envelope 10 to be removed. It is understood that the duration of the application of electrical current and pressure to the end portions 10a and 10b may vary in accordance with the type of materials used and the particular dimensions of the materials. As an example, the current may be applied for between about 1 and about 2 seconds and the pressure for between about 1 and about 2 seconds after termination of the current.

The seal obtained between the end portions 10a and 10b of the envelope 10, in accordance with the foregoing, has proven sufficiently strong to withstand strong oxidation tests which renders it eminently suitable for the battery separator environment disclosed above. However, it is understood that the apparatus of the present invention is not limited to such an environment, but is applicable to other environments utilizing dielectric heat sealing of this type.

Of course, variations of the specific construction and arrangement of the apparatus disclosed above can be made by those skilled in the art without departing from the invention as defined in the appended claims.

I claim:

1. Apparatus for heat sealing two lapped end portions of a sheet material prefolded to form a sleeve having a hollow interior, said apparatus having a lower support and an upper support, said upper support adaptable for movement with respect to said lower support, wherein the improvement comprises:
   a. An electrode, said electrode being mountable relative to said lower support for receiving said sheet material, said electrode being a platen having a shape conforming to a shape formed by said hollow interior of said sleeve;
   b. a clamping means, said clamping means being adjustably adapted for positioning said prefolded sheet material and aligning said two lapped end portions, relative to said platen, to effect an optimum transfer of heat energy to said lapped end portions; and
   c. a second electrode, carried by said upper support, for applying a predetermined amount of heat energy to said material at said two lapped end portions between fold lines defining said end portions and not including said fold lines to seal said lapped end portions together whereby cracking of said sleeve along said fold lines is prevented.

2. Apparatus for heat sealing two lapped end portions of a sheet material prefolded to form a sleeve having a hollow interior, said apparatus having a lower support and an upper support, said upper support adaptable for movement with respect to said lower support, wherein the improvement comprises:
   a. an electrode, said electrode being mountable relative to said lower support for receiving said sheet material, said electrode being a platen having a shape complementary to a shape formed by said hollow interior of said sleeve;
   b. a clamping means, said clamping means being adjustably adapted for positioning said prefolded sheet material and aligning said two lapped end portions, relative to said platen, to effect an optimum transfer of heat energy to said lapped end portions; and
   c. heat supplying means, carried by said upper support, for applying a predetermined amount of heat energy to said material to seal said lapped end portions together, and wherein said heat applying means comprises a second electrode, extending longitudinally with respect to said platen, said upper support being adjustable to cause said second electrode to engage said sleeve in a region of said lapped end portions, said second electrode having a flattened contact surface and arcuate sides extending from said surface, said contact surface and said arcuate sides permitting transfer of said heat energy only to said lapped end portions of said sheet material, said arcuate sides preventing contact of said second electrode with fold lines defining said end portions whereby cracking along said fold lines is prevented.

3. The apparatus of claim 2 wherein said sheet material comprises a polymeric resinous matrix having particles of an inorganic filler dispersed throughout said matrix and includes a network of micropores formed therein.

4. The apparatus of claim 3 wherein said polymeric resinous matrix is polyvinyl chloride and said disperse inorganic filler is silica.

5. The apparatus of claim 2, wherein said clamping means comprises two opposed plates, pivotally mounted to a platform, for urging opposed walls of said sheet material against said platen, said clamping means further comprising urging means for urging said plates towards each other.

6. An apparatus of claim 5, wherein said platen further comprises an indexing means for positioning said two end portions, with respect to said platen, to receive said optimum transfer of heat while said platen is extended between said clamping means, said indexing means comprising a pin projecting from a side surface of said platen.

7. The apparatus of claim 5, wherein said platen is pivotally mounted relative to said clamping means between an upright position, in which said clamping means receives said sheet material, and an operative position in which said platen extends between said clamping means.

8. The apparatus of claim 1, wherein said platform is formed of an electrical conductive material, and said platform is movable relative to said lower support to enable said platen to attain said upright position while clearing said bar electrode.

9. The apparatus of claim 2, wherein said shape of said platen enables said platen to engage a lower lapped portion of said two end portions along a longitudinal direction, and wherein an adjustment of said second electrode enables said second electrode to simultaneously contact an upper lapped portion of said two end portions in said longitudinal direction while said platen engages said lower lapped portions, said flattened contact surface being in substantial contact with said platen without contacting said fold lines, by which application of said heat energy to said two end portions uniformly seals said end portions together without said cracking.

10. The apparatus of claim 2, wherein said heat is high frequency electrical energy.

11. The apparatus of claim 10, wherein said high frequency electrical energy is in a range of about 27 MgHz.

12. The apparatus of claim 11, wherein said electrical energy is applied for as long as 2 seconds.

13. A method for heat sealing two lapped end portions of a sheet material prefolded to form a sleeve having a hollow interior, which comprises:

a. positioning said prefolded sheet material on an electrode so that said end portions of said sheet material overlap each other and said electrode serves as a platen having a shape conforming to a shape formed by said hollow interior of said sleeve;

b. urging the opposed walls of said prefolded sheet material which extend at an angle to said lapped end portions against said platen to effect alignment of said overlapped end portions for transfer of heat energy thereto; and c. engaging said prefolded sleeve in the region of said aligned overlapped end portions with a second electrode to permit said transfer of heat energy to the material of said end portions between the fold lines defining said end portions and preventing engagement of said second electrode with said fold lines to dielectrically heat seal said end portions together without causing cracking of said end portions along said fold lines.

* * * * *